(No Model.)
O. F. PAYNE & J. C. KRISHER.
PUMP.
No. 373,903. Patented Nov. 29, 1887.
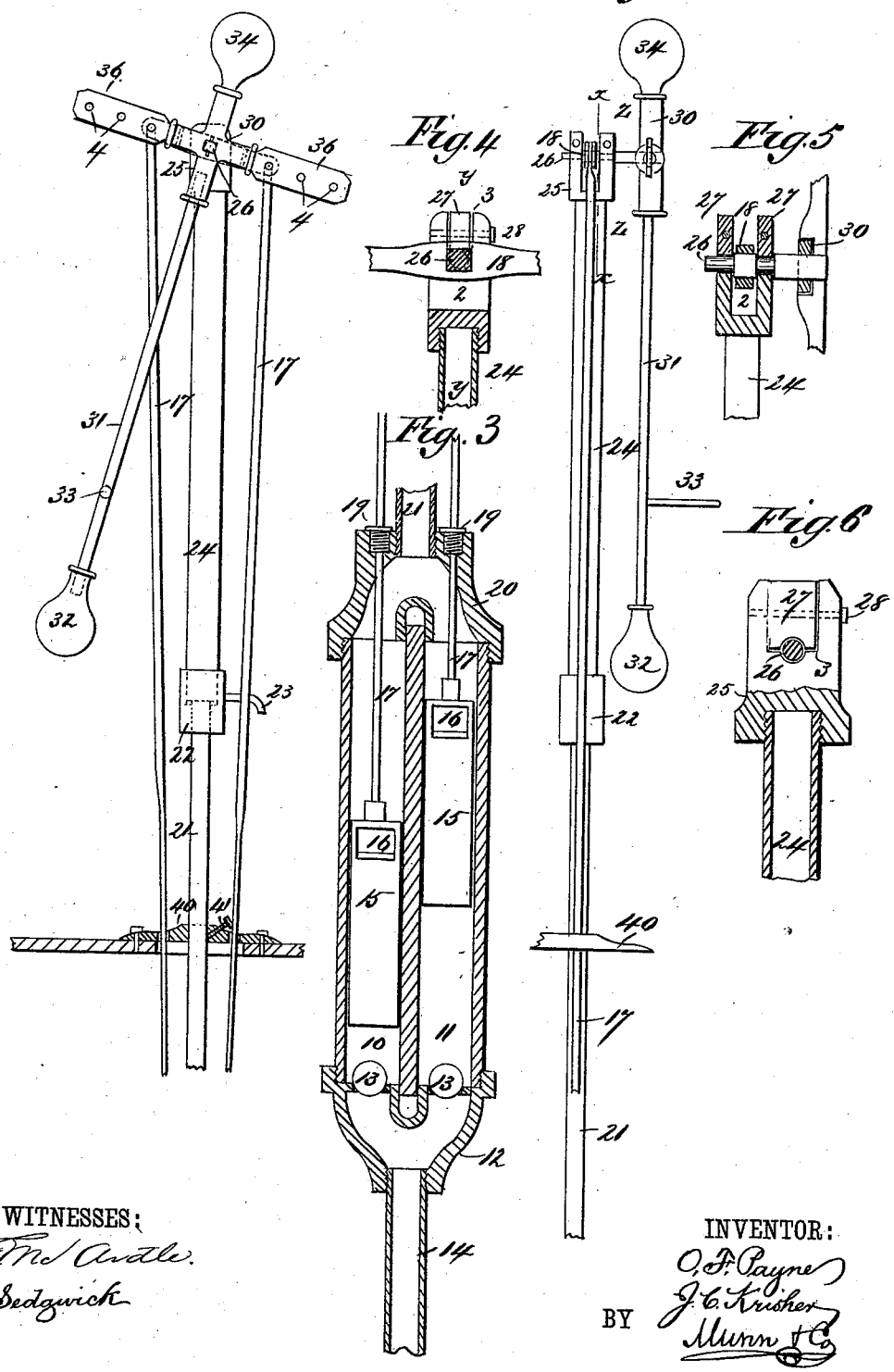
WITNESSES:
INVENTOR:
O. F. Payne
J. C. Krisher
BY Munn & Co
ATTORNEYS.

UNITED STATES PATENT OFFICE.

ORLANDER F. PAYNE AND JOHN C. KRISHER, OF ABILENE, KANSAS.

PUMP.

SPECIFICATION forming part of Letters Patent No. 373,903, dated November 29, 1887.

Application filed February 9, 1887. Serial No. 227,036. (No model.)

*To all whom it may concern:*

Be it known that we, ORLANDER F. PAYNE and JOHN C. KRISHER, of Abilene, in the county of Dickinson and State of Kansas, have invented a new and Improved Pump, of which the following is a full, clear, and exact description.

This invention relates to pumps, the object of the invention being to provide a double-acting pump and one wherein the momentum of a pendulous body may be utilized to aid in the raising of the water.

Reference is to be had to the accompanying drawings, forming a part of this specification, in which similar figures of reference indicate corresponding parts in all the views.

Figure 1 is a side view of the upper portion of our improved pump. Fig. 2 is an edge view of the same. Fig. 3 is an enlarged central sectional view of the lower portion of the pump in which the two plunger-chambers are formed. Fig. 4 is an enlarged sectional view taken upon a line corresponding with the line *x x* of Fig. 2. Fig. 5 is a sectional view taken upon a line corresponding with the line *y y* of Fig. 4; and Fig. 6 is a detail view of the head-block, the lower portion of the block and the upper portion of the tube forming the air-chamber being shown in section, the view being taken upon a line corresponding with line *z z* of Fig. 2.

In constructing such a pump as the one illustrated in the drawings above referred to we provide two suction-chambers, 10 and 11, that are connected to a doubly-apertured coupling-piece, 12, ball-valves 13 being arranged as shown in Fig. 3. The main suction-pipe is connected to the lower portion of the coupling 12, this pipe being shown at 14, and being arranged to extend downward within the water that is to be raised by the action of the pump.

Within the chambers 10 and 11 there are mounted plungers 15, that are provided with flap-valves 16, and connected by rods 17 with a walking-beam, 18, the rods 17 passing from the chambers 10 and 11 through stuffing-boxes 19, that are carried by an upper coupling, 20, a discharge-pipe, 21, being connected to said coupling 20 and arranged to extend upward to a coupling, 22, which is tapped to receive a discharge-nozzle, 23, an upwardly-extending tube, 24, being connected to the coupling 22; and this tube 24 serves as the support for a head-block, 25, and as an air-chamber.

The head-block 25 is formed with a deep central slot, 2, and with transverse slots 3, the lower ends of which are rounded, as shown in Fig. 6, the shaft 26 of the walking-beam 18, resting within said rounded portions, being held in place by retaining-blocks 27, that are inserted within the recesses 3, and held to place by pins or bolts 28. That section of the shaft 26 upon which the walking-beam 18 is seated is squared or irregularly formed, and one of the projecting ends of this shaft is also squared to receive a spider, 30.

To the downwardly-extending arm of the spider 30 there is secured a lever, 31, which carries a weight, 32, and is provided with a handle, 33, while to the upwardly-extending arm of the spider 30 there is secured a counter-balance, 34. The side arms of the spider carry short lever-arms 36, that are formed with apertures 4, by means of which connection may be established with a connecting-rod leading from the crank-shaft of any proper form of motor—such, for instance, as a windmill.

In operation, if the pump is to be operated by hand, the handle 33 of the lever 31 is grasped and said lever is reciprocated, thus rocking the walking-beam 18 and alternately raising and lowering the plungers 15, which plungers move in opposite directions. As the plungers are so reciprocated, the air within the tube 24 will be compressed, and will act to force the water out of the nozzle 23 under a high pressure, so that the pump may be used for the purpose of extinguishing fires, or for any other purpose for which a force-pump is adapted.

It will of course be understood that the same rocking motion would be imparted to the walking-beam 18 if either one of the lever-arms 36 were connected, as hereinbefore described, with a crank-shaft of any proper form of motor. It will be seen that the momentum of the pendulous lever 31 will materially aid the pumping action.

In order that the pump may be set at such depth as may be required, we provide a sustaining-plate, 40, through which the tube 24 and the connecting-rod 17 pass, proper apertures being formed in said plate to permit of such passage of the parts named, and this plate 40 is provided with a set-screw, 41, which may be turned to clamp the pipe 21 in such position as may be required.

Having thus fully described our invention, we claim as new and desire to secure by Letters Patent—

1. In a pump, the combination, with the plungers 15 and their cylinders, of a pipe extending up from the plunger-cylinders and provided with a head-block at its upper end, a shaft journaled in the said block, a walking-beam on the shaft, connections between the walking-beam and plungers, a four-armed lever on the projecting end of the said shaft, and weights on the upwardly and downwardly extending arms of the said lever, substantially as herein shown and described.

2. In a pump, the combination of the cylinders 10 11, the pipe 21, the coupling 22, provided with nozzle 23, the pipe 24, projecting from the coupling and provided with the head-block 25, the walking-beam 18, pivoted in the head-block, the connecting-rods 17, the spider 30, the lever 31, provided with the weights 32 and 34, and the levers 36, substantially as herein shown and described.

ORLANDER F. PAYNE.
JOHN C. KRISHER.

Witnesses:
C. C. BILLING, Jr.,
W. S. HARLEY.